United States Patent
Liao

(10) Patent No.: US 7,500,555 B1
(45) Date of Patent: Mar. 10, 2009

(54) LINK PLATE FOR A METAL WASTE CONVEYER

(75) Inventor: Chin-Lien Liao, Ta-Ya Hsiang (TW)

(73) Assignee: Miaw Yeou Metal Industry Co., Ltd, Taichung County (TW)

( * ) Notice: Subject to any disclaimer, the term of this patent is extended or adjusted under 35 U.S.C. 154(b) by 0 days.

(21) Appl. No.: 12/142,843

(22) Filed: Jun. 20, 2008

(51) Int. Cl.
*B65G 15/30* (2006.01)

(52) U.S. Cl. ............. 198/844.1; 198/690.2; 198/836.1; 198/850; 198/851; 198/852; 198/853

(58) Field of Classification Search ............. 198/690.2, 198/699.1, 836.1, 836.3, 844.1, 850–853; 59/27, 35.1; 29/DIG. 3
See application file for complete search history.

(56) References Cited

U.S. PATENT DOCUMENTS

| | | | | |
|---|---|---|---|---|
| 2,681,728 A * | 6/1954 | Boron | ................ | 198/851 |
| 2,725,975 A * | 12/1955 | Franz | ................ | 198/822 |
| 2,989,169 A * | 6/1961 | Clapp et al. | ................ | 198/822 |
| 3,243,035 A * | 3/1966 | Ratkowski | ................ | 198/822 |
| 3,664,491 A * | 5/1972 | Scanlon et al. | ......... | 198/867.06 |
| 3,874,497 A * | 4/1975 | Carlson | ................ | 198/836.3 |
| 3,980,425 A * | 9/1976 | Pinettes et al. | ............. | 432/239 |
| 4,155,444 A * | 5/1979 | Kovats | ................ | 198/822 |
| 4,448,053 A * | 5/1984 | Holmstrom | ................ | 72/102 |
| 4,535,963 A * | 8/1985 | Lachonius | ................ | 248/251 |
| 4,840,269 A * | 6/1989 | Anderson | ................ | 198/822 |
| 5,082,108 A * | 1/1992 | Douglas | ................ | 198/836.4 |
| 5,119,926 A * | 6/1992 | Draebel et al. | .......... | 198/836.3 |
| 5,137,144 A * | 8/1992 | Uehara | ................ | 198/822 |
| 5,756,131 A * | 5/1998 | Suh | ................ | 425/442 |
| 6,220,426 B1 * | 4/2001 | Giana | ................ | 198/818 |
| 6,237,750 B1 * | 5/2001 | Damkjaer et al. | .......... | 198/778 |
| 6,601,697 B2 * | 8/2003 | Steeber et al. | .......... | 198/844.1 |
| 6,766,901 B2 * | 7/2004 | Guldenfels et al. | .......... | 198/837 |
| 6,767,264 B2 * | 7/2004 | Mercer | ................ | 441/65 |
| 6,827,204 B2 * | 12/2004 | Cribiu' | ................ | 198/844.1 |
| 7,048,112 B2 * | 5/2006 | Formigoni et al. | ....... | 198/861.3 |
| 7,261,203 B2 * | 8/2007 | Mindich | ................ | 198/819 |
| 7,293,643 B2 * | 11/2007 | Burkhard | ................ | 198/850 |

* cited by examiner

*Primary Examiner*—Douglas A Hess
(74) *Attorney, Agent, or Firm*—Ming Chow; Sinorica, LLC

(57) ABSTRACT

A link plate for a metal waste conveyer is composed of plural flat plates, and each of them has its lengthwise opposite side edges respectively provided with plural staggered pivotal members and opposite lateral ends respectively compressed to form a vertical side plate. Before the side plate is compression molded, the flat plate has its opposite short sides respectively compressed to form a bar projection with a preset length and thickness. The central line of the bar projection is parallel to the lengthwise central line of the flat plate and perpendicular to the bending line of the side plate. The bar projection has its opposite ends respectively positioned on the side plate and the flat plate, having one end on the side plate located lower than the upper edge of the side plate to form a space therebetween, and the other end on the flat plate extended to a preset length for reinforcing the supporting force of the side plate.

4 Claims, 10 Drawing Sheets

LINK PLATE FOR A METAL WASTE CONVEYER

BACKGROUND OF THE INVENTION

1. Field of the Invention

This invention relates to a link plate for a metal waste conveyer, particularly to one able to enhance combination strength between the side plates and the flat plates of a metal waste conveyer to prevent the side plates from becoming deformed when they are bumped or pushed by external force.

2. Description of the Prior Art

A metal waste conveyer used for collecting and conveying metal waste is generally assembled at a location where metal waste or parts drop down when a cutting machine is carrying out metal processing, such as a computer milling machine or a computer numerical controlled lathe (CNC lathe). Therefore, the base portion of the left and the right side plate of the conveyer must be strong enough; otherwise the side plates are likely to be bumped and pushed by loading articles and become deformed. Thus, when the conveyer is operated, two adjacent side plates will interfere with and press against each other to produce loss and make noises. Further, the deformed side plates may cause cracks and let metal waste stuck in between two side plates to increase loss and even cause stoppage to the machine.

The link plate of a conventional metal waste conveyer, as shown in FIG. 1, includes a plurality of long rectangular flat plates 10 combined together. Each flat plate 10 has its opposite lengthwise side edges respectively fixed with plural staggered pivotal member 11 formed by bending and rolling up the side edges of the flat plate 10 so that plural flat plates 10 can be pivotally connected in series to make up a ring conveyer belt. Each flat plate 10 has its opposite short ends respectively compressed and formed with a side plate 12 perpendicular to the flat plate 10. The side plates are respectively bent along a lengthwise central line (a) of the flat plate 10 to form a front first superposing surface 121 and a rear second superposing surface 122 so that plural flat plates 10 can be connected together by means of continuous mutual superposition of the first and the second superposing surfaces 121 and 122.

FIG. 2 shows a process of compression molding the link plate of the conventional metal waste conveyer. For elevating the strength of the base portion of the side plate 12, before the side plate 12 is compression molded, the flat plate 10 has the undersides of its opposite short sides respectively compressed upward to form a semi-circular concave recess 13 having its central axial line (b) perpendicular to the lengthwise central line (a) of the flat plate 10 and also intersected with the bending line (c) of the flat plate 10 and the side plate 12. When the semi-circular concave recess 13 is compression molded, the opposite front side of the flat plate 10 will be formed with a lug 14, and after the side plate 12 is compression molded, the lug 14 is located at the intersection portion of the flat plate 10 and the side plate 12. In the course of compression molding the semi-circular concave recess 13, the flat plates 10 and the side plates 12 are once again compressed and squeezed to make their metal molecular structure comparatively close together to elevate the base strength of the side plates 12, and the flat surface of the intersection portion of the flat plate 10 and the side plate 12 is changed into an arc-shaped lug 14 to avoid metal waste staying at the bent corners for reducing loss. In addition, the side plate 12 has its opposite side edges respectively slanting toward the central line (a) of the flat plate 10. Thus, after the first superposing surface 121 of a front side plate 12 is overlapped with the second superposing surface 122 of a rear side plate 12, a gap (d) will be formed on the second superposing face 122 to prevent the lug 14 on the second superposing surface 22 from interfering with the first superposing surface 121. By so designing, a continuous metal waste-receiving groove 15 can be formed for collecting metal waste or parts dropping down when a cutting machine is carrying out metal processing. Then, the metal waste will be conveyed to a gathering site by the conveyer driven by chains 16 that are respectively assembled at the opposite outer sides of the side plates 12.

However, although the lug 14 provided at the intersection portion of the bending line (c) of the flat plate 10 and the side plate 12 can resist stretching of the side plate 12 to avoid destroying its molecule structure when the side plate 12 is compression molded, yet after the side plates 12 are compression molded, the lugs 14 only can a little increase the strength of the base portion of the side plate 12, but cannot elevate the supporting force of the flat plate 10 toward its opposite side plates 12 nor can they enhance the strength of combined stress between the front and the rear flat plate 10.

FIG. 3 shows that the side plate 12 of the link plate of the conventional metal waste conveyer becomes inclined and deformed when it is bumped by external force. If the free ends of the side plates 12 are bumped for long by dropping metal waste or parts, the side plates 12 with insufficient strength at the base portion are likely to be bumped and become slanting inward or outward to let the front and the rear side plate 12 rub each other to produce loss and make noises. In addition, the deformed side plate 12 may cause cracks to let metal waste stuck between two adjacent side plates 12 to hinder the metal filings from conveyed normally.

SUMMARY OF THE INVENTION

The objective of this invention is to offer a link plate for a metal waste conveyer, able to reinforce the supporting force of the side plates respectively positioned at the opposite sides of plural flat plates for preventing the side plates from slanting inward or outward and deformed when they are bumped or pushed by dropping metal waste or parts and enabling a cutting machine to carry out metal processing normally.

The feature of this invention is that before the flat plate is compressed to form the side plates, the flat plate has the underside of its opposite short sides respectively compressed upward to form a bar projection with a preset length and thickness, letting the rear side of the first superposing face of the side plate compressed to form an elongate recess. The lengthwise central line of each bar projection is parallel to the transverse central line of the flat plate and perpendicular to the bending line of the side plate. The bar projection has its opposite ends respectively positioned on the side plate and the flat plate, and the end of the bar projection on the side plate is located lower than the upper edge of the side plate to form a space therebetween, and the other end of the bar projection on the flat plate is extended to a preset length. The bar projection is about twice as thick as the flat plate.

Thus, the bar projections can elevate supporting strength for the side plates to stand erect at the opposite sides of the flat plate and enhance integral combination strength and endurance between the side plates and the flat plate to prevent the side plates from slanting inward or outward to rub each other and make noises, thus enabling the metal waste conveyer to operate normally and avoiding metal waste adhering to the joint corner of the side plates and the flat plates. In addition, the bar projections are provided before the side plates are compression molded; therefore, in a compression molding process, the side plates will not be stretched, able to avoid destroying the molecular structure of the side plates and make the metallic structure of the flat plates comparatively closer together.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
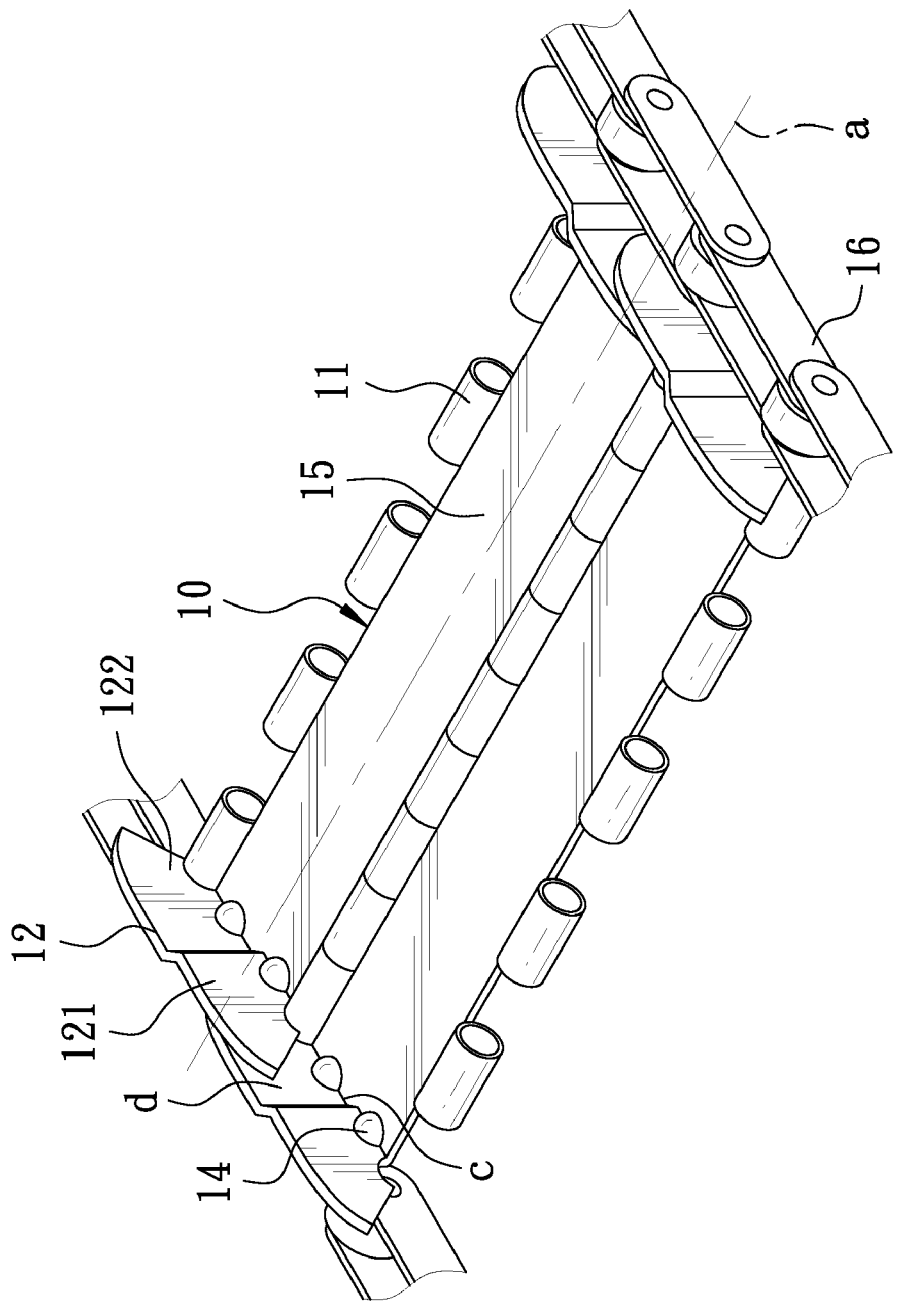
FIG. 1 is a perspective view of the link plate of a conventional metal waste conveyer.
Figure 2:
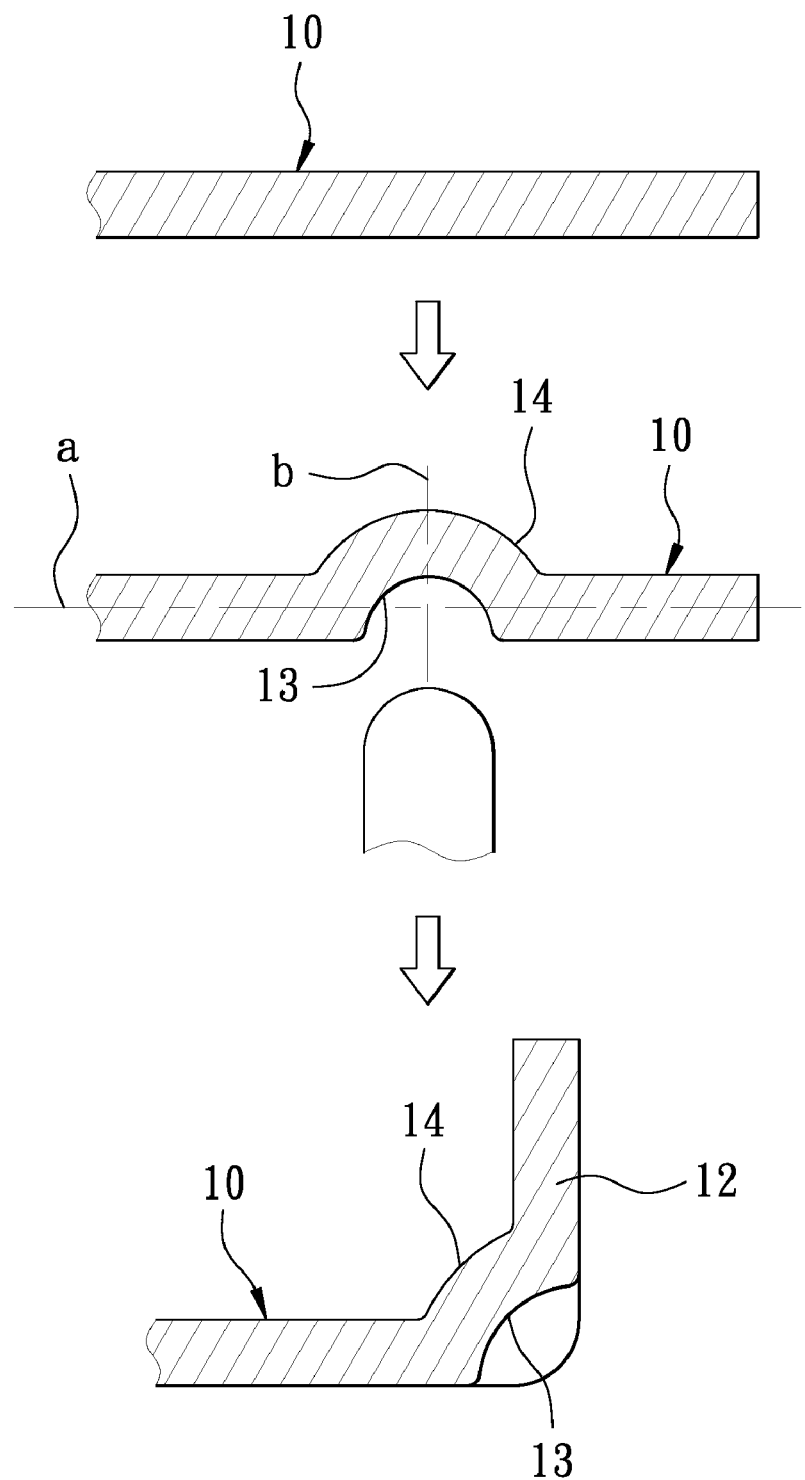
FIG. 2 is a front view of a process of compression molding the link plate of the conventional metal waste conveyer.
Figure 3:
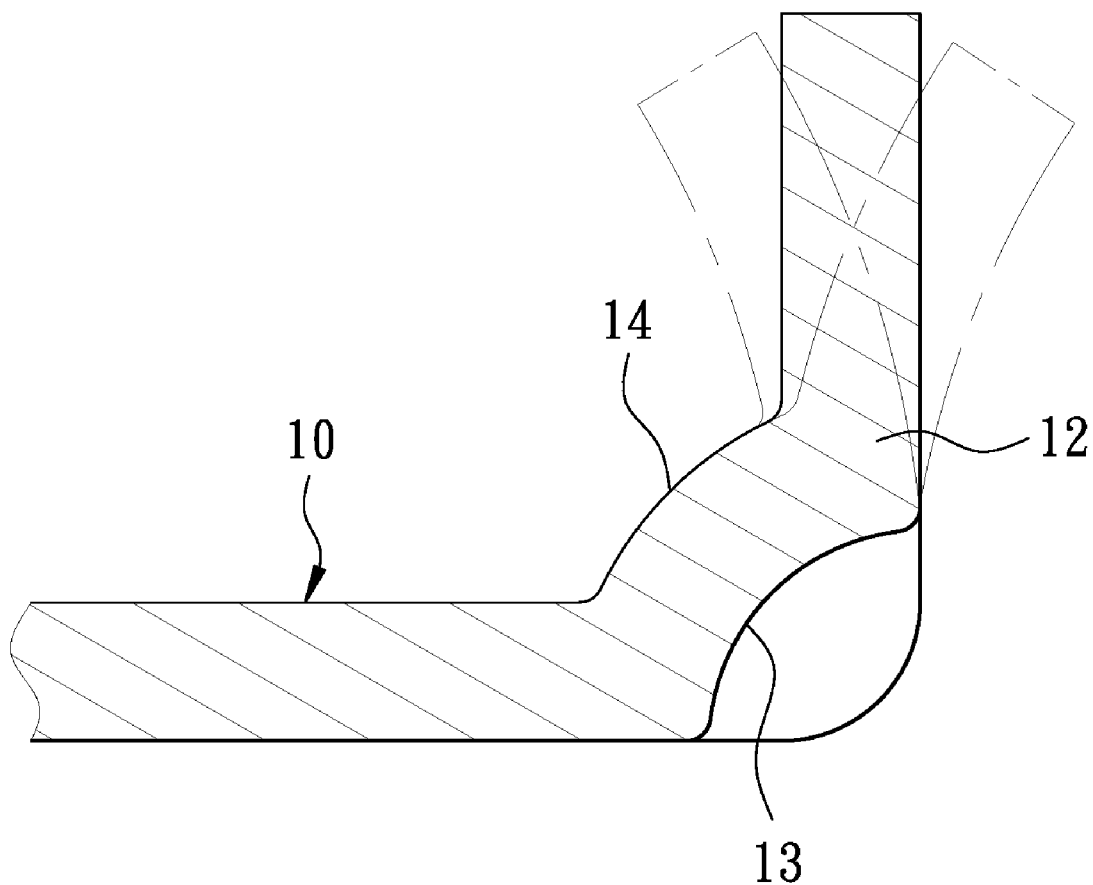
FIG. 3 is a front view of a side plate of the link plate of the conventional metal waste conveyer, showing that the side plate is bumped by external force and become slanting inward or outward.
Figure 4:
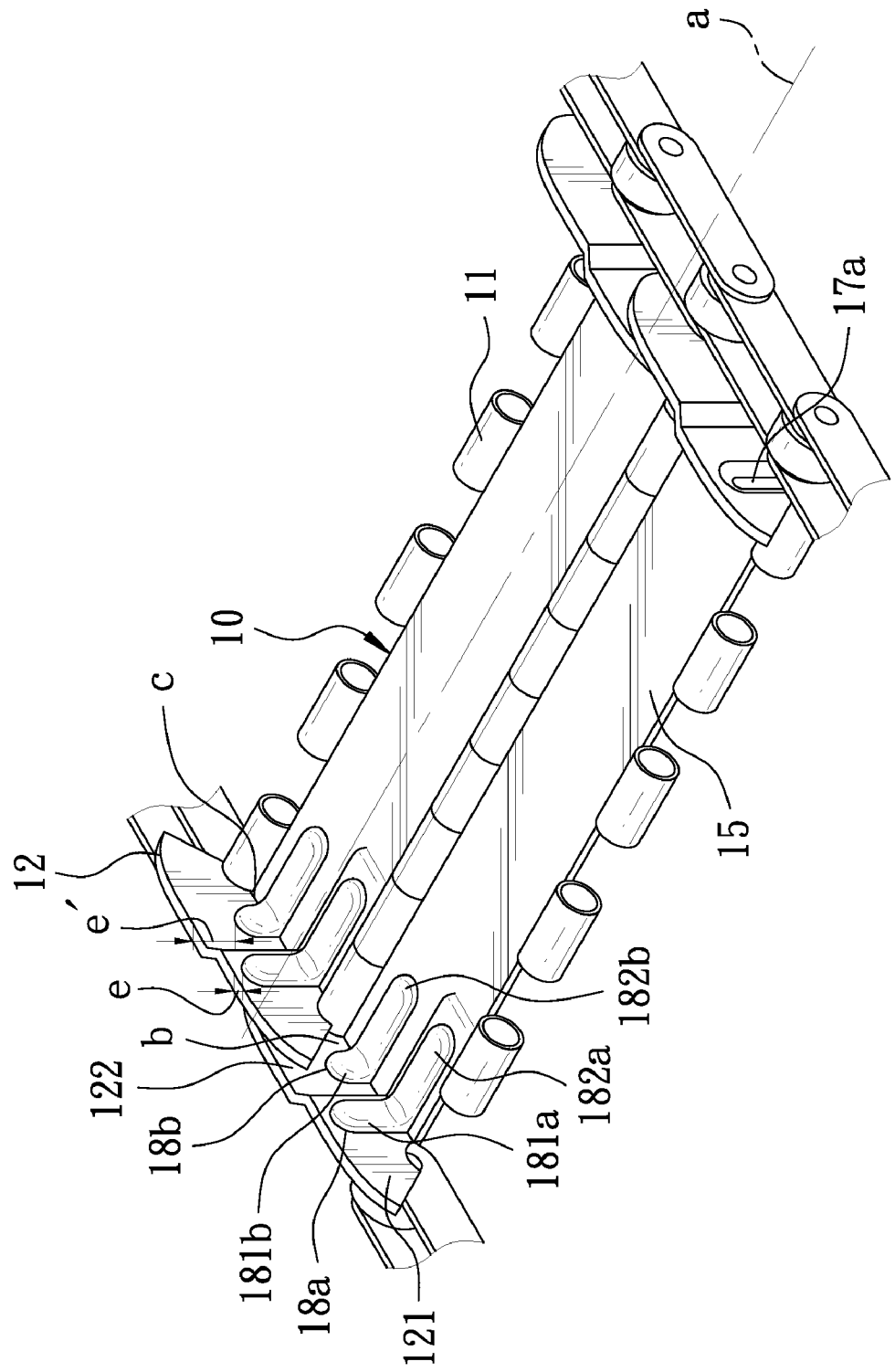
FIG. 4 is a perspective view of a first preferred embodiment of a link plate for a metal filings conveyer in the present invention.

A first preferred embodiment of a link plate for a metal waste conveyer in the present invention, almost having the same structure as the conventional one, as shown in FIGS. 4-8, includes a plurality of long rectangular flat plates 10 combined together. Each flat plate 10 has its opposite lengthwise side edges respectively provided with plural staggered pivotal members 11 formed by bending and rolling up the side edge of the flat plate 10 so that plural flat plates 10 can be pivotally connected in series to make up a chain conveyer. Each flat plate 10 has its opposite short sides respectively compressed to form a side plate 12 perpendicular to the flat plate 10, and each side plate 12 is bent along the lengthwise central line (a) of the flat plate 10 to form a front first superposing face 121 and a rear second superposing face 122. Thus, adjacent flat plates 10 can be continuously overlapped with each other by having the first superposing face 121 of a front side plate 12 overlapped on the second superposing face 122 of an adjacent rear side plate 12, and the adjacent flat plates 10 can be pivotally connected together by means of the pivotal member 11 to form a continuous metal filings—receiving groove 15 for collecting metal filings or parts dropping down when a cutting machine is carrying out metal processing.

Figure 5:
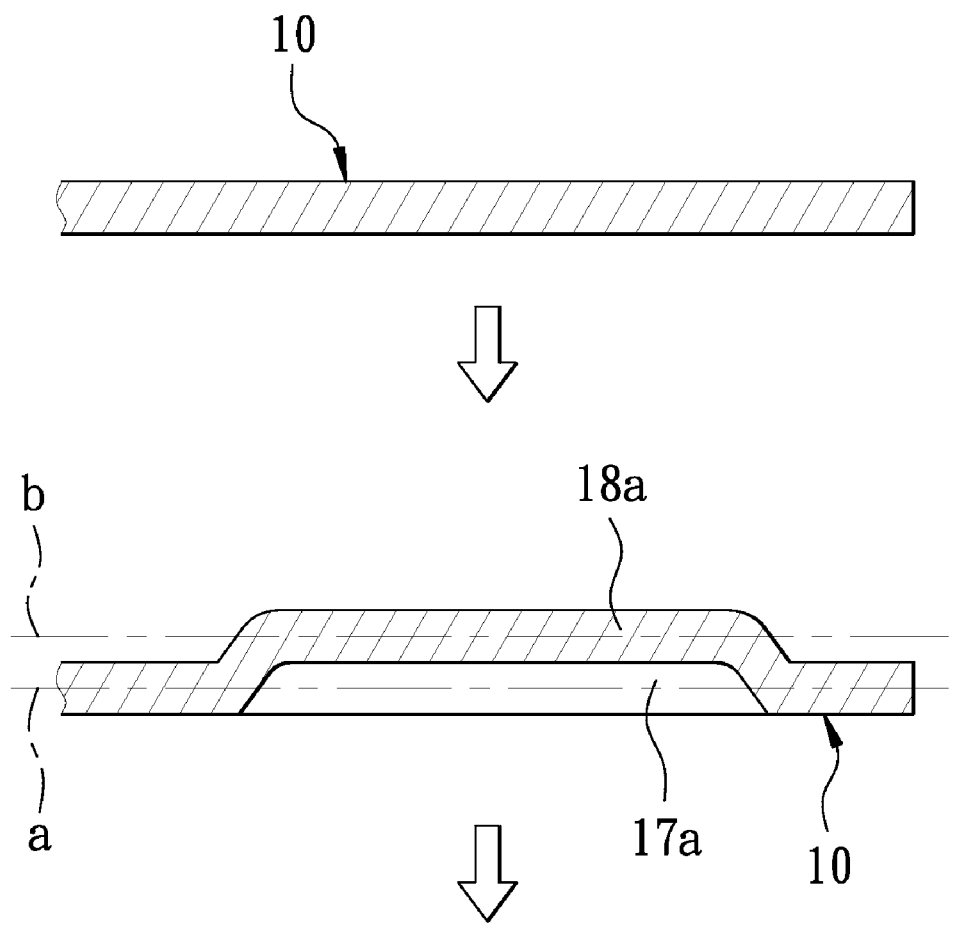
FIG. 5 is a front view of the first preferred embodiment in the present invention, showing steps of having a single flat plate compressed to from a bar projection.
Figure 6:
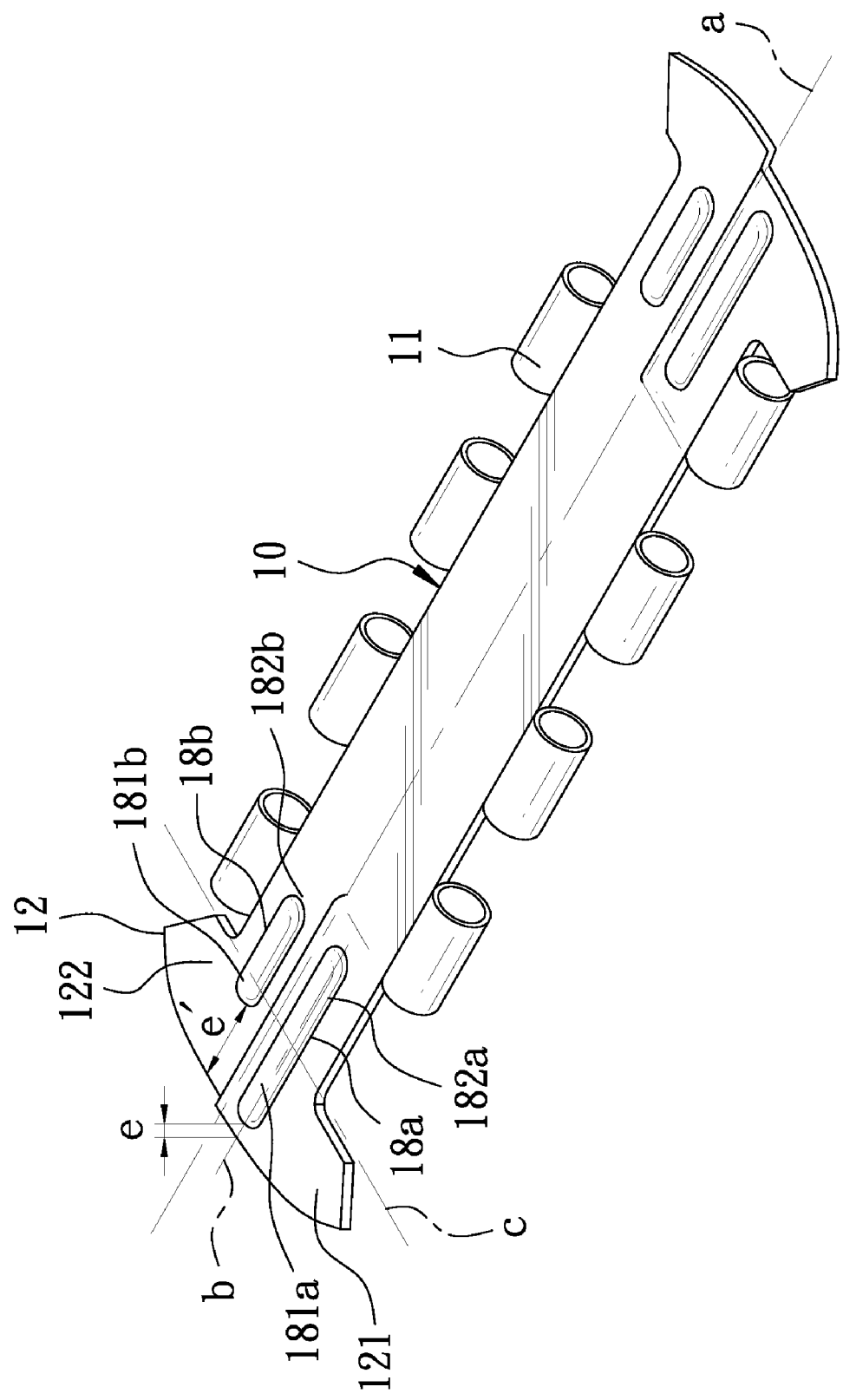
FIG. 6 is a perspective view of the first preferred embodiment in the present invention, showing the opposite sides of a single flat plate respectively compressed to form a side plate.
Figure 7:
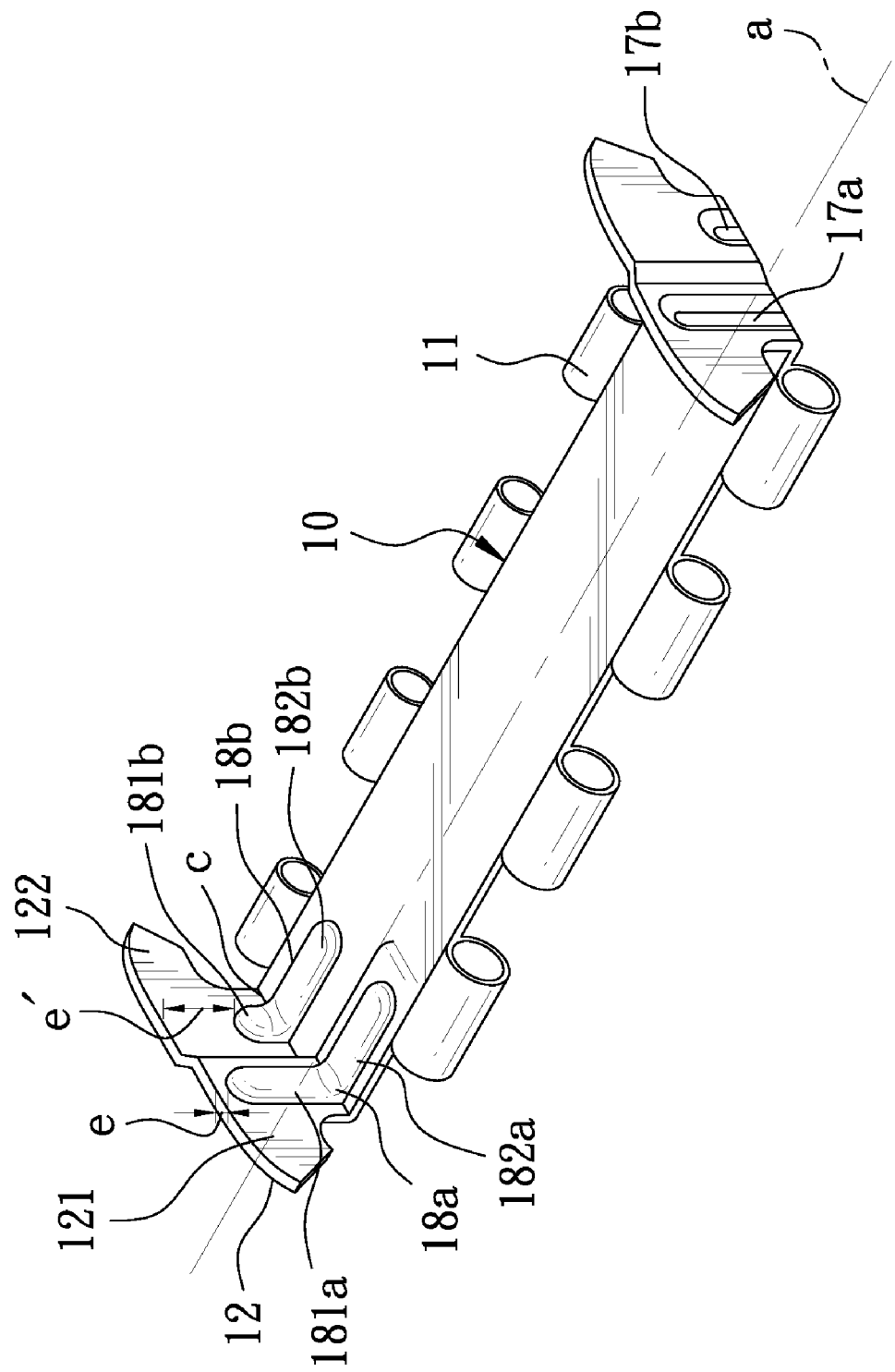
FIG. 7 is a front perspective view of the first preferred embodiment in the present invention, showing a single flat plate having its opposite sides respectively compressed to form a vertical side plate.
Figure 8:
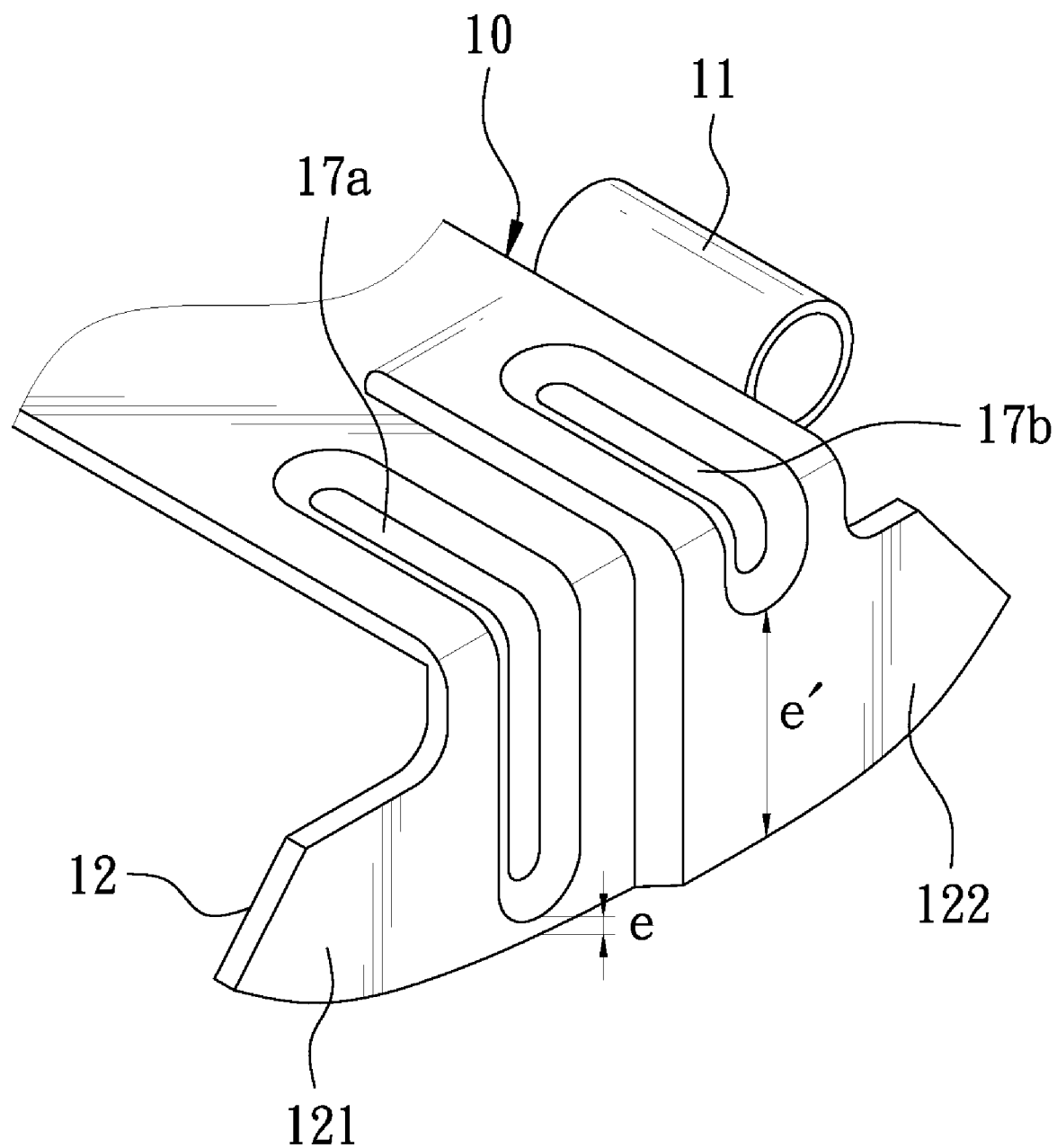
FIG. 8 is a rear perspective view of the first preferred embodiment in the present invention, showing a single flat plate having its opposite sides respectively compressed to form the vertical side plate.

FIG. 5 is a front view of the first preferred embodiment, showing the steps of having a single flat plate 10 compressed to form a bar projection. FIG. 6 is a perspective view of the first preferred embodiment, showing that a single flat plate 10 has its opposite sides respectively compressed and formed with a side plate 12. FIG. 7 is a front perspective view of the first preferred embodiment of the side plate 12, and FIG. 8 is a rear perspective view of the first preferred embodiment of the side plate 12. Before the flat plate 10 has its opposite side plates 12 compression molded, the flat plate 10 has the underside of its opposite short sides respectively compressed upward to form a bar projection 18a and 18b with a proper length and thickness, letting the opposite rear side of the flat plate 10 formed with an elongate recess 17a and 17b. The lengthwise central line (b) of the bar projection 18a, 18b is parallel to the transverse central line (a) of the flat plate 10 and perpendicular to the bending line (c) of the side plate 12. Further, the two bar projections 18a and 18b have their opposite ends respectively located on the side plate 12 and on the flat plate 10, and the end 181a and the end 181b of the bar projection 18a and the bar projection 18b on the side plate 12 are positioned lower than the upper edge of the side plate 12, respectively having a space (e) and a space (e') formed therebetween. The other end 182a and 182b of the bar projection 18a and 18b on the flat plate 10 are respectively extended to a preset length on the flat plate 10. The space (e) and (e') respectively formed between the end 181a, 181b of the bar projection 18a, 18b and the upper edges of the first superposing face 121 and the second superposing face 122 are different in size. For avoiding mutual interference after the bar projections 18a, 18b are respectively overlapped with the first superposing face 121 and the second superposing face 122, the end 181b of the bar projection 18b on the side plate 12 is designed not to extend into a gap (d) formed between the first superposing face 121 of a front side plate 12 and the second superposing face 122 of a rear side plate 12, and the bar projections 18a, 18b are about twice as thick as the flat plate 10.

Referring to FIGS. 7 and 8, when the flat plate 10 has its opposite sides respectively compressed along the bending line (c) of the side plate to form the side plate 12, the side plate 12 having the bar projections 18a, 18b mounted thereon will not be stretched in the process of compression, able to avoid destroying the molecule structure of the side plates 12 and make the metallic structure of the flat plate 10 comparatively close together. In addition, the spaces (e) and (e') respectively formed between the bar projection ends 181a, 181b and the upper edge of the first and the second superposing face 121, 122 of the side plate 12 can elevate integral combination strength and endurance for the side plate 12 to be firmly positioned vertically at the opposite sides of the flat plate 10, able to prevent the side plates 12 from slanting inward or outward when they are bumped by external force.

Figure 9:
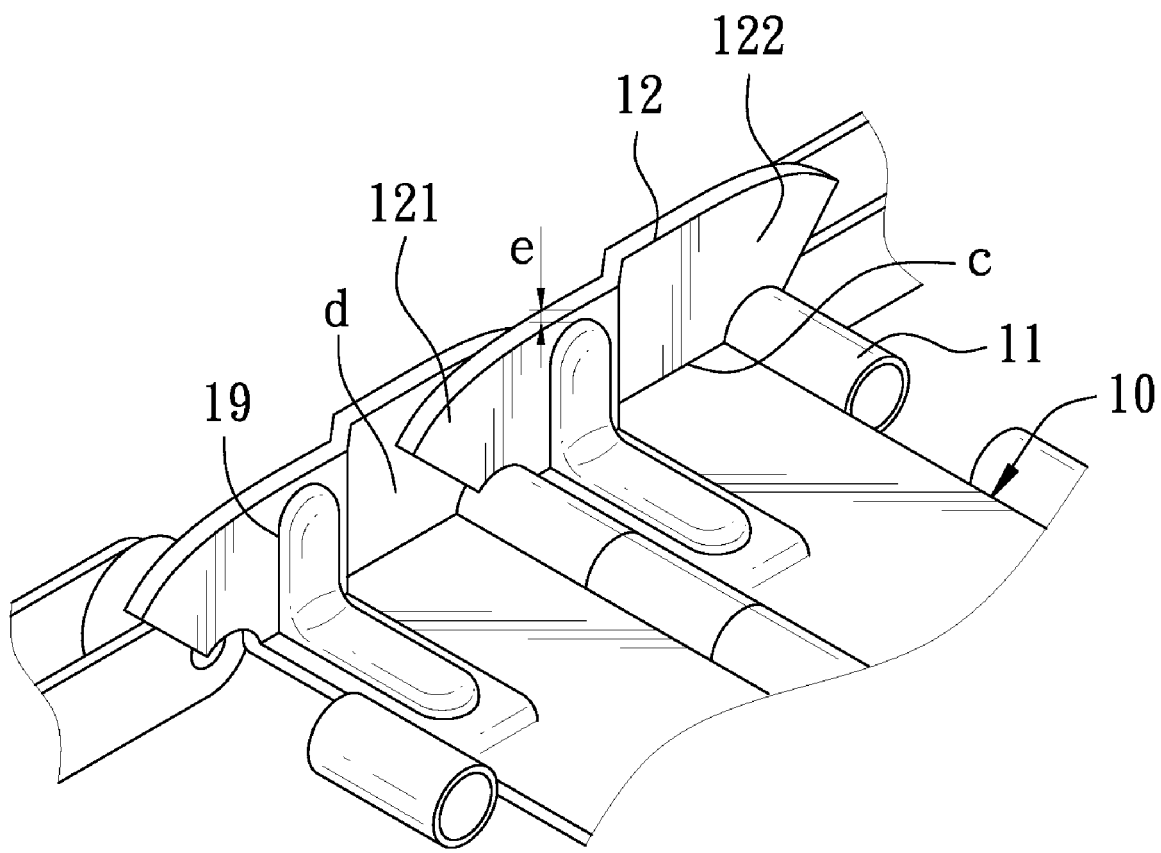
FIG. 9 is a partial perspective view of a second preferred embodiment of a link plate for a metal waste conveyer in the present invention.

A second preferred embodiment of a link plate for a metal waste conveyer in the present invention, as shown in FIG. 9, has almost the same structure as that described in the first preferred embodiment, except that only one bar projection 19 is provided on the side plate 12 and the flat plate 10. Substantially, a metal waste conveyer has many uses and can bear various articles with different sizes and weights; therefore, the number of the bar projections provided on a link plate has to be decided in accordance with different special cases. It is clear that the number of the bar projections is not the point of emphasis in the present invention.

Figure 10:
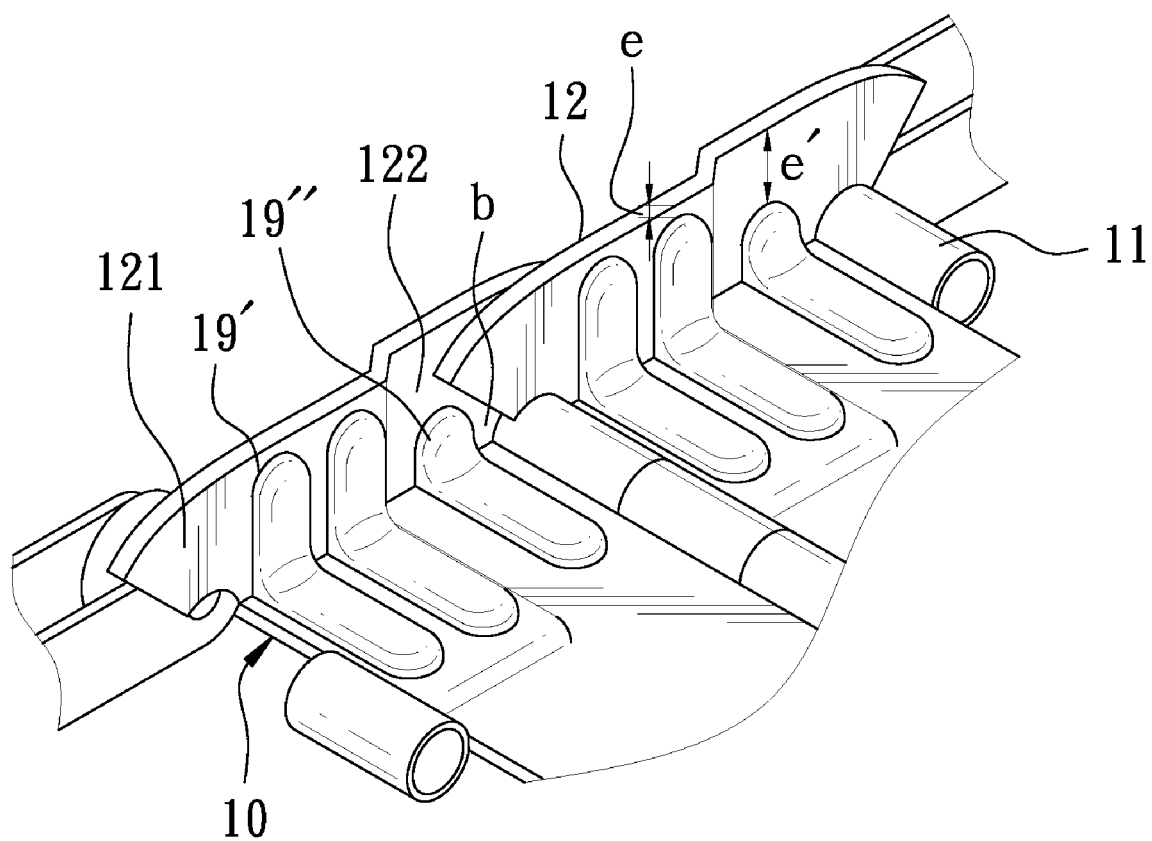
FIG. 10 is a partial perspective view of a third preferred embodiment of a link plate for a metal waste conveyer in the present invention.

A third preferred embodiment of a link plate for a metal filings conveyer in the present invention, as shown in FIG. 10, has almost the same structure as that described in the first preferred embodiment, except that the first superposing face 121 and the second superposing face 122 of one side plate 12 is provided thereon with two or more bar projections 19', 19" spaced apart at a proper interval and arranged in parallel for reinforcing the supporting force of the side plate 12 and enhancing integral combination strength and endurance between the side plate 12 and the flat plate 10.

While the preferred embodiments of the invention have been described above, it will be recognized and understood that various modifications may be made therein and the appended claims are intended to cover all such modifications that may fall within the spirit and scope of the invention.

I claim:

1. A link plate for a metal filings conveyer comprising a plurality of flat plates combined together, each said flat plate having two opposite lengthwise side edges respectively provided with plural staggered pivotal members, said flat plates pivotally connected in series to form a chain conveyer by said pivotal members, each said flat plate having two opposite lateral ends respectively compressed to form a vertical side plate, said vertical side plate bent along a transverse central line of said flat plate to form a front and a rear first superposing face and a second superposing face, said first superposing face of a front side plate and said second superposing face of a rear side plate overlapped continuously with each other to make up a link plate with a metal-waste receiving groove; and, characterized by each said flat plate having two opposite short sides respectively compressed upward to form a bar projection with a preset length and thickness, each said bar projection having its lengthwise central line parallel to a lengthwise central line of said flat plate and perpendicular to a bending line of said side plate, said bar projection having its opposite ends respectively positioned on said side plate and on said flat plate, an end of said bar projection on said side plate located lower than upper edge of said side plate and having a space formed therebetween, another end of said bar projection on said flat plate extended for a preset length, said bar projection being about twice as thick as said flat plate.

2. The link plate for a metal filings conveyer as claimed in claim 1, wherein said side plate has its opposite side edges respectively slanting toward a central line of said side plate so that after said first superposing face of one of said side plates is overlapped with said second superposing face of the other of said side plates, a gap will be formed on said second superposing face.

3. The link plate for a metal filings conveyer as claimed in claim 2, wherein said first superposing face and said second superposing face of said flat plate are respectively provided thereon with a bar projection, length of one end of said bar projection on said side plate not exceeding said gap.

4. The link plate for a metal filings conveyer as claimed in claim 1, wherein said first superposing face and said second superposing face of the one of said side plate are disposed thereon with two or more bar projections spaced apart at a preset interval and arranged in parallel.

\* \* \* \* \*